March 16, 1965    H. N. FRIEDLANDER ETAL    3,173,904
PREPARATION OF SOLID OLEFIN POLYMERS
Filed June 25, 1959
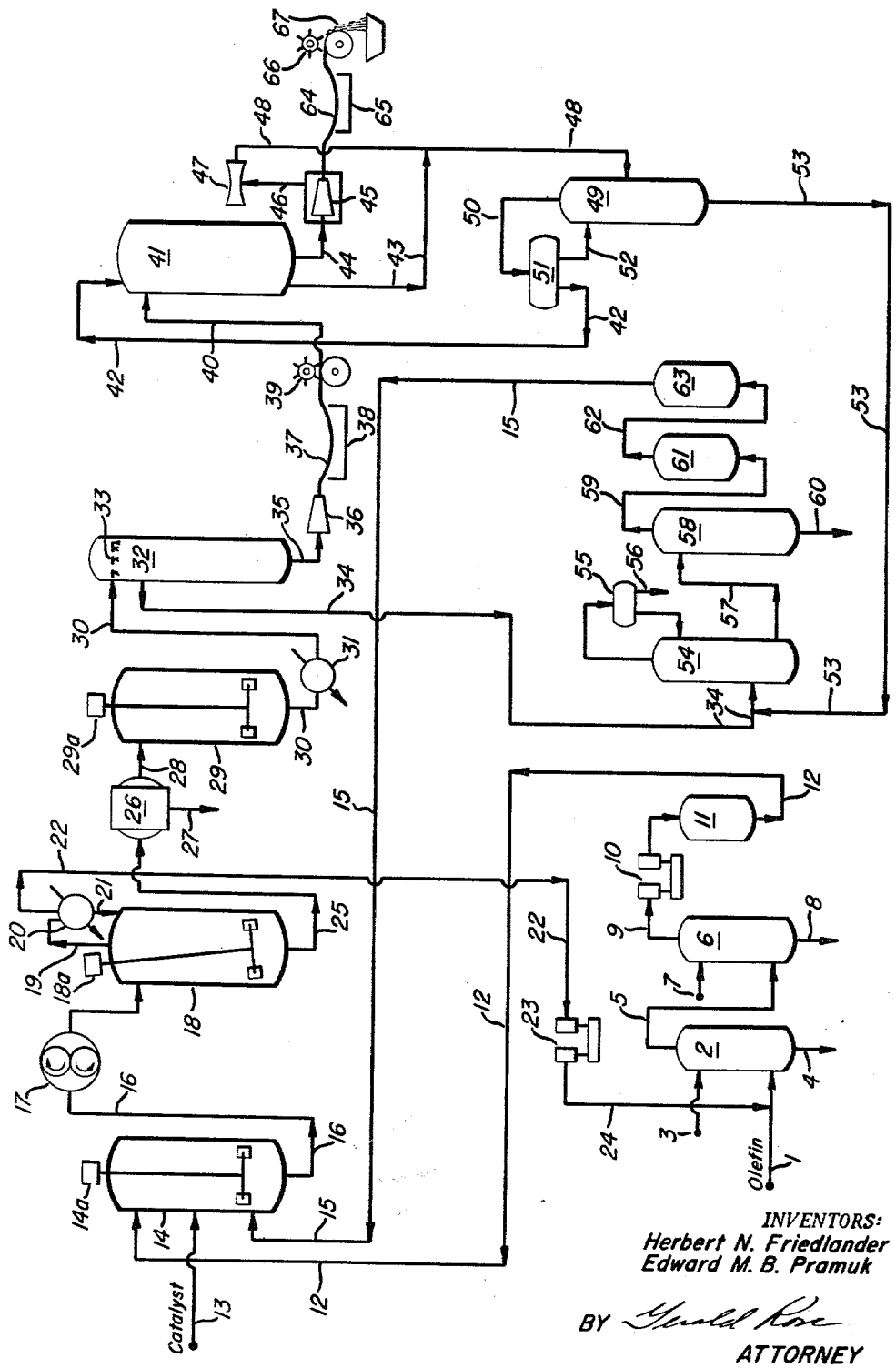
INVENTORS:
Herbert N. Friedlander
Edward M. B. Pramuk
BY *Gerald Rose*
ATTORNEY 3,173,904
PREPARATION OF SOLID OLEFIN POLYMERS
Herbert N. Friedlander, Homewood, Ill., and Edward M. B. Pramuk, Hammond, Ind., assignors to Standard Oil Company, Chicago, Ill., a corporation of Indiana
Filed June 25, 1959, Ser. No. 822,829
4 Claims. (Cl. 260—94.9)

This invention relates to improvements in commercial techniques for the manufacture of normally solid polymers from ethylene and propylene. More particularly, it pertains to an improved method of recovering solid polymers which have been prepared by solution polymerization techniques in the presence of heterogeneous catalysts.

It is known that an olefin such as ethylene or propylene in a hydrocarbon solution can be polymerized into normally solid homopolymers or copolymers by heterogeneous, i.e. solid catalysts. It is also known that the nature and purity of the inert hydrocarbon reaction medium to a large measure determine the ease and facility with which polymerization can be affected. Unfortunately, the best hydrocarbon media, from the standpoint of avoiding an undesirable liquid-liquid phase separation at high temperatures, are of relatively high boiling points, and consequently are not easily removed from the resultant solid polymer. Also, difficulties in separating the finely divided solid catalysts from a reaction mixture which contains normally gaseous components (ethylene or propylene), normally liquid components (hydrocarbon reaction medium) and a normally solid olefin polymer is an exceedingly difficult chore. While each of these problems can be solved, individually, by means well known to the art, such means often entail the use of highly complex and exceedingly expensive facilities.

Accordingly, a primary object of the present invention is to provide an improved commercial process for producing normally solid homopolymers or copolymers of ethylene and propylene by a process which produces a very high quality polymer yet at materially reduced investment and operating costs. A further object is to provide such system which is capable of accommodating a wide variety of catalysts, either alone or with co-catalysts or catalyst promoters. An additional object is to provide a process which permits the recovery of high quality normally solid polymers, and at the same time permits purification and ultimate recycle of any or all of the components of the reaction mixture. A still further object is to provide a polymerization and polymer recovery system which permits using heterogeneous catalysts and the superior high boiling inert hydrocarbon reaction media. An important object is to produce a substantially catalyst-free, reaction medium-free, and "grease" free solid olefin homopolymer or copolymer. Other and more particular objects will become apparent as the description of the invention proceeds in detail.

Briefly, in accordance with the invention, normally solid olefin polymers are produced by polymerizing ethylene and/or propylene with a solid polymerization catalyst in the presence of a substantially inert high boiling liquid hydrocarbon reaction medium, i.e. a substantially non-reactive hydrocarbon having a mid boiling point in the range of about 200–480° F., at a sufficiently high temperature to produce the polymer as a solution in the hydrocarbon reaction medium and excess unreacted olefin. The reaction mixture is then flashed at reduced pressure to remove at least a major amount of the unreacted olefin from a solution of polymer, hydrocarbon reaction medium, and catalyst. Catalyst is then removed from the solution by physical separation means such as filtration, centrifugation, or electrostatic precipitation. The effluent is flash distilled to remove most of the separate liquid hydrocarbon reaction medium in vapor form from a molten predominantly-polymer material. This melt is then extruded so as to increase its surface area, and extracted with a low boiling paraffin, having from 3 to 7 carbon atoms per molecule, inclusive, so as to displace the higher-boiling hydrocarbon reaction medium. Paraffin extraction also extracts a wax or "grease," which is a relatively low molecular weight amorphous by-product of the polymerization. The paraffin extracted extrudate is then mechanically worked at subatmospheric pressure to remove adherent low boiling paraffin and to prepare a purified ethylene or propylene normally-solid polymer of commerce.

It is also contemplated within the scope of this invention to provide means for the optional recovery and recycle of the solid polymerization catalyst, the co-catalyst or promoter if any, excess unreacted olefin, high boiling liquid hydrocarbon reaction medium, and paraffinic extraction solvent. As will appear hereinafter, the purification and recycle of these components is performed in an exceedingly simple manner.

The instant process possesses many advantages over hitherto available polymerization and solid olefin purification processes. Primarily, it permits the use of highly active heterogeneous polymerization catalysts with either hydrocarbon-soluble or insoluble co-catalysts, and effects polymerization under the rapid conditions of solution polymerization, using high boiling liquid hydrocarbon reaction media. As mentioned previously, these high boiling media avoid a troublesome phase separation problem observed at high temperatures, where catalyst concentrates in one liquid phase while olefin monomers concentrates in another.

Moreover, plants can be constructed and operated at minimal operating and investment costs. Also, the polymer is recovered in a form which contains less than 0.1% catalyst, water white, and with essentially no hydrocarbon reaction medium and "grease." Further advantages will be apparent in the ensuing description.

The invention will be more clearly understood from the following detailed description of a specific example of a commercial plant for making about 20,000 pounds per day of ethylene homopolymer. For simplicity, many auxiliaries such as utilities, pumps, gauges, accumulators, and duplicate equipment have been omitted, but the location and need for these are readily apparent to chemical engineers.

Referring to the drawing, about 1000 pounds per hour of ethylene is introduced into the ethylene purification system by way of line 1. Although any known purification system may be employed, it is preferred to utilize the train shown herein, comprising caustic scrubber 2 for the removal of acid gases such as $H_2S$ and $CO_2$, water wash tower 6 to remove entrained caustic, and molecular sieve 11 to dry the olefin gas.

Although in the present example the feed consists of ethylene, a particular advantage of the instant process is that it may be employed with a feed consisting of propylene or a mixture of ethylene and propylene to prepare ethylene-propylene copolymers of varying compositions. For copolymers, duplicate olefin storage and purification systems are used.

Ethylene is introduced via line 1 to the bottom of caustic scrubbing tower 2, wherein it is intimately contacted with a descending stream of aqueous caustic of about 1–20 weight percent concentration which is introduced via line 3 and withdrawn via line 4. Tower 2 may be packed with rings or saddles or the like made of an inert material to effect a large contact surface between liquid and gas. The caustic-scrubbed ethylene ordinarily at a pressure of a few hundred pounds per square inch gauge and at ambient temperature, is withdrawn through line 5 and passes through water-washing tower 6, where a stream of water introduced through line 7 and withdrawn through line 8 removes entrained caustic mist. Tower 6 may also be packed to effect good contact.

Line 9 conducts the water-washed ethylene stream to compressor 10, which increases the pressure to at least the pressure of polymerization reactor 14. Compressor 10 discharge pressure thus may be from, say, 10 p.s.i.g. to 30,000 p.s.i.g. or higher, preferably beween about 100 and about 2000 p.s.i.g. for usual polymerization systems.

The discharge stream from compressor 10 is passed through dryer 11, which is filled with a material having an affinity for water vapor. This material is preferably a molecular sieve (calcium aluminosilicate), which is a zeolite having a pore size of about 5 Angstroms, operated at ambient temperature. Since the dryer material eventually becomes saturated, it is preferred that two or more dryers 11 be employed, with proper manifolding for maintaining one onstream while the other is taken offstream for regeneration by heating and inert gas blowing.

The purified ethylene stream, taken off at line 12, should contain not more than 50 parts per million oxygen, not more than about 50 p.p.m. of $CO_2$ or CO, and should have a dew point below about −45° C. It is then conducted via line 12 to reactor 14.

Heterogeneous polymerization catalysts are well known, and a considerable variety of these have been widely described in patent and in the scientific literature. Most of them are transition heavy metal compounds, and they may be promoted with suitable hydrocarbon-soluble or with hydrocarbon-insoluble co-catalysts. No claim of novelty per se is herein made to the catalyst or catalyst system, as these have been previously developed and are currently under development by others. An extensive discussion of solid polymerization catalysts appears in an article by Friedlander and Resnick in "Advances in Petroleum Chemistry and Refining," volume I, chapter 11, pages 527–570. These authors group the catalysts into four classifications; preformed transition metal elements or oxides on high surface supports, promoted transition oxide catalysts; solid catalysts precipitated in situ by reacting transition metal salts and organo metallic compounds; and pretreated precipitated catalysts in combination with organo metallic compounds.

Considering first the preformed transition metal elements or oxides on high surface supports (surface area greater than about 100 square meters per gram), these are primarily transition heavy metals in elemental or oxide form which are found in Groups IV, V, VI and VIII of the Mendeleef Periodic Table. Such metals include titanium, chromium, molybdenum, and cobalt, extended on the difficulty reducible metal oxides such as silica, alumina, magnesia, titania, zirconia, clays, etc.

The promoted oxide catalysts are exceedingly active. Most of these are oxides (including hydrated oxides) of one or more metals of Groups IV, V and VI of the Mendeleef Periodic Table, promoted by a co-catalyst which is usually an element, a hydride (including complex hydrides such as $NaBH_4$) or an organo metallic compound such as an alkyl (including the alkyl sesquihalides) of elements in Groups I, II and III of the Periodic Table. The metal oxides are also preferably extended on high surface area supports. Specific examples of co-catalysts are lithium borohydride, sodium metal, potassium metal, beryllium alkyls, diborane, and aluminum trialkyls such as aluminum triethyl or aluminum diethylchloride. Alkali metals and their hydrides are normally solids.

Precipitated solid catalysts may be prepared by the interaction of compounds of Groups IV, V and VI transition heavy metals with hydrocarbon derivatives such as alkyls, aryls, and sesquihalides of aluminum, magnesium, or zinc, or with Group I metal alkyls. Specific examples include titanium chlorides or vanadium oxychlorides with aluminum trialkyls, such as aluminum triisobutyl. These hydrocarbon derivatives are normally hydrocarbon-soluble.

The pretreated precipitated catalysts are generally found among the halides of transition heavy metals of Groups IV, V and VI reduced to a submaximum valence state, in combination with an active co-catalyst such as the hydrides and organo metallic compounds of Groups I, II and III elements. The preferred combination is titanium trichloride with aluminum triethyl.

The foregoing enumeration includes many of the catalyst system which are now well known, but is not intended to be a complete listing of known or prospectively discoverable heterogeneous catalysts. For example, recent publications have described such diverse catalysts or co-catalysts as alkyls of tin, bismuth, and indium.

The third component of the reaction mixture is a substantially inert hydrocarbon liquid, i.e. a liquid which is sufficiently non-active under polymerization conditions so as not to materially interfere with the polymerization reaction or deleteriously affect the resultant polymer. These liquid hydrocarbons have a 50% disillation point (ASTM method) of between about 200 and about 480° F., more preferably between about 350 and about 400° F., and include both pure hydrocarbon compounds and mixtures of hydrocarbons. Their initial and final boiling points are usually within 150 and about 700° F., respectively. A highly sulfuric acid-treated kerosene, known commercially as odorless mineral spirits, is perhaps the most convenient and one of the best liquid hydrocarbon reaction media; this material consists almost entirely of paraffins and has a boiling range nominally of about 350–410° F. Various classes of hydrocarbons or their mixtures which are liquid and are substantially unreactive with olefins under polymerization reaction conditions can be employed. Thus, normally liquid saturated hydrocarbons (alkanes and cyclo alkanes) having from 10 to about 12 carbon atoms per molecule such as decane or dodecane, alkenes which are free from terminal olefin structures, or aromatic hydrocarbons of suitable mid-boiling points can be used. A detailed listing of solvents is found in Field and Feller U.S. Patent 2,691,647.

The composition of the reaction mixture depends on optimum choice of inter-related factors such as catalyst activity, pressure and temperatures, catalyst and olefin concentrations, etc. Generally, the concentration of olefin in the reaction mixture can be varied from about 2 to about 50% by weight, more often 2 to about 30% by weight, preferably about 5 to about 25% by weight, e.g. 10%. Similarly, the reaction mixture will contain nearly equivalent concentrations of polymer at the end of a run. The ratio of liquid hydrocarbon reaction medium to catalyst, on a weight basis, can be varied in the range of from 5:1 to about 3.000:1, or even higher for flow systems.

Pressures and temperatures are likewise relatively independent variables. The temperature may be varied over wide ranges, for example from about 220° F. to about 650° F. or higher, preferably from about 450 to about 550° F., provided only that the resultant normally solid olefin polymer remains as a single phase homogenous solution or gel at reaction conditions and during subsequent purification. Aromatic hydrocarbons possess a somewhat higher solvent power for solid olefin polymers, and accordingly, somewhat lower temperatures may be employed than when using paraffinic solvents. The reaction time, in a batch polymerization system, may vary from about five minutes to 24 hours or more, and in a continuous system the average reaction time may be in the same range. Pressures, as indicated previously, may be from atmospheric to 30,000 p.s.i.g. or even higher.

Again inviting attention to the attached drawing, the polymerization reaction is effected continuously in reactor 14 at a pressure of about 1,000 p.s.i.g and a temperature of about 470–500° F. A catalytically effective amount, within the previously discussed range, of catalyst is introduced via line 13; this catalyst is 10% molybdenum oxide on gamma alumina, which has been reduced with hydrogen gas at a temperature of about 800–1200° F. and which has been ground to a mesh size of about 100 mesh. Also, a sufficient amount of finely dispersed or bulk sodium metal in a slurry of odorless mineral spirits solvent is introduced via the same line. Approximately 8000 pounds per hour of solvent is admitted via line 15, while ethylene is introduced through line 12, on pressure control to provide a constant pressure of about 1,000 p.s.i.g. in the reactor.

Reactor 14 is equipped with an agitator such as rotary impeller 14a, and with coils or jacketing to provide temperature control. The polymerization reaction is highly exothermic, and accordingly heat must be removed by indirect cooling or by condensing and refluxing solvent during the reaction. Ordinarily, it is convenient to introduce the solvent and the ethylene at the approximate reaction temperature, and provide cooling during the reaction period.

Reactor 14 may be operated in a continuous manner or batchwise, or may be operated continuously with intermittent charging of olefin feed stock, catalyst, and polymer, and either intermittent or continuous withdrawal of reaction mixture. In the preferred embodiment, catalyst and hydrocarbon reaction medium are introduced continually while ethylene monomer is introduced continuously or semi-continuously to maintain the desired reaction pressure.

After reaction, the reaction mixture is withdrawn via line 16. It now consists of about 8000 pounds per hour of solvent, about 830 pounds per hour of normally solid olefin polymer, about 30 pounds per hour of molybdena-alumina catalyst, about 20 pounds per hour of sodium metal co-catalyst, and about 800 pounds per hour of excess unreacted ethylene. It is then transferred to metering pump 17, which serves the purpose of controlling the flow of reaction mixture as it is released into the lower pressure existing in flash drum 18. Although an ordinary pressure-controlling valve may be employed, it has been found that a positive displacement type of metering pump is superior to pressure valves for the purpose of effecting pressure reduction since it substantially reduces foaming in flash drum 18.

The reaction mixture in flash drum 18 experiences a rapid vaporization or flashing of at least a major portion of the unreacted ethylene, together with some of the liquid hydrocarbon reaction medium. The pressure of flash drum 18 may be any pressure which is substantially less than reactor 14 pressure, preferably a pressure on the order of 1–50 p.s.i.g. Flash drum 18 may also be provided with agitator 18a and with heating coils or jacket, not shown, to provide additional heating for ethylene removal. Vapor-form solvent which is flashed along with unreacted ethylene leaves flash drum 18 through line 19 to condenser 20, where the liquid hydrocarbon solvent or reaction medium is condensed and returned to flash drum 18 via line 21. Uncondensed ethylene flows via line 22 to recycle ethylene compressor 23 for purification and reuse in the polymerization system.

Meanwhile, the molten solution or normally solid olefin polymer and liquid hydrocarbon reaction medium, containing the catalyst, is pumped from flash drum 18 via line 25 to catalyst separation facilities, illustrated by filter 26. This solution or melt has a temperature of around 300–450° F. and has a composition depending upon the extent of polymerization which occurred in reactor 14. Ordinarily, the solution may contain from about 10 to about 25 weight percent polymer, but may be as little as 2 percent or as much as 50 percent by weight of solid polymer.

Catalyst, or at least the solid portions thereof, is separated by separation facilities illustrated as filter 26, which effects a physical separation of the solid catalyst particles from the remaining solution. A filter medium, such as cellulosic sheets, of resin impregnated Eaton-Dikeman filter paper No. 928–95 is employed in a high pressure filter, preferably of the plate and frame type, to effect such separation. Alternative non-chemical catalyst separation facilities, such as centrifuges, electrostatic precipitators, and the like may be substituted for the cellulosic filter. When however, a filter of any type is employed, it is highly desirable to assure that substantially all, i.e. 90% or more, of the unreacted ethylene is removed in flash drum 18 prior to filtration, since the pressure drop across a filter would cause undesirable flashing of ethylene and complicate subsequent polymer and liquid hydrocarbon reaction medium workups. Also, olefin would tend to polymerize on the catalyst and cause plugging of the cellulosic sheets.

The solid catalyst and catalyst promoter which are separated by means of separation facilities 26 is withdrawn through conduit 27. Depending upon the intrinsic value of the catalyst, it may either be discarded or may be reprocessed for use. Processing may take any of several forms, including heating to 400–1200° F. in the presence of an oxygen-containing gas, followed by reduction with hydrogen gas at about the same temperature range. The catalyst may then be returned to reactor 14.

The catalyst-free solution then passes via line 28 to filtrate receiver 29, where batches of filtrate are accumulated for continuous processing thereafter. Filter receiver 29 may be equipped with agitator 29a and with suitable insulation and heating facilities.

The solution is then pumped at a temperature of about 350° F. via line 30 to heater 31, where its temperature is increased to about 500–600° F., e.g. 550° F., before admission to flash or melt still 32. In melt still 32, the solution or melt of polymer in liquid hydrocarbon reaction medium is flash distilled (preferably without fractionation trays) at low superatmospheric pressure, e.g. 1–100 p.s.i.g., to remove at least a major amount of the liquid hydrocarbon reaction medium. Melt still 32 preferably is equipped with a perforated distributor pipe 33 near the top thereof for the purpose of finely dispersing the polymer-hydrocarbon solution and thus effecting good flashing. Liquid hydrocarbon reaction medium, in vapor form, is withdrawn through line 34 and passes to the reaction-medium recovery facilities, to be discussed presently.

The polymer-rich bottoms from melt still 32, containing only a minor amount, desirably from about 10 to about 35 weight percent of hydrocarbon reaction medium, e.g. 20%, is withdrawn at a temperature of about 400–500° F., e.g. 425° F., and pumped via line 35 to extruder 36. In extruder 36, the molten polymer-rich solution is forced through dies for the purpose of forming an extrudate having a relatively high surface area; these dies may be of any convenient size or shape which will extend the surface area suitably. Polymer strands 37 are quenched by cooling in water trough 38 where the strands solidify and are then picked up and then preferably cut into short lengths by means of chopper 39. The chopped extrudate then passes to line 40 to hexane extractor 41.

Extraction with hexane, or other paraffin such as propane, butane, cyclohexane, etc., having from 3 to 7 carbon atoms per molecule, inclusive, accomplishes several purposes. For one thing, it displaces the higher boiling hydrocarbon reaction medium from the extruded polymer, and renders subsequent polymer purification by mechanically working under vacuum substantially more feasible whenever a hydrocarbon-soluble co-catalyst is employed, hexane extraction also serves to remove this from the final polymer. Also, it removes "grease," a relatively low molecular weight olefin polymer which may be undesirable in the final polyethylene product; the amount of grease is largely dependent upon the nature of the polymerization catalyst system, and with some systems there is a considerable amount of grease. Lastly hexane extraction removes the last traces of volatiles, contaminant color bodies and any odiferous materials, all of which would be undesirable in polymers employed for handling foodstuffs and the like.

The quantity of hexane solvent may be varied over wide limits, from about 0.5 to about 50 or even more pounds of hexane per pound of solid polymer, depending on the degree of contamination of the polymer, of the amount and nature of impurities originally present, and on the desired quality of the final polymer product. Suitably, from about 2 to about 6 pounds of hexane per pound of polymer may be employed. The extraction temperature ($-40°$ F. to about $77°$ F.) and pressure are correlated with each other and with the extraction time (one-half to about twenty-four hours) to provide sufficient extraction. The extraction temperature is purposely held below the softening point of the polymer so as to avoid fusing the polymer chunks; temperatures are preferably below about $200°$ F. for ethylene homopolymers, and below about $170°$ F. for copolymers. Typical conditions for ethylene homopolymers include seven hours of continuous extraction of a batch of polymer at a temperature of about $170°$ F. and with about six pounds of hexane per pound of solid polymer continuously flowing through the hexane extractor 41.

Fat liquor from hexane extractor 41 is conducted via line 43 to hexane fractionating column 49, where the hexane is distilled overhead through vapor line 50 into receiver 51. A portion of the overhead is refluxed to fractionating column 49 via line 52, while another portion is conducted through line 42 back to hexane extractor 41 for additional solvent extraction.

Solvent-extracted polymer containing a minor amount of adherent hexane is conducted through line 44 to a mechanical working device such as vacuum extruder 45. There hexane is removed by physically or mechanically working the polymer at elevated temperature under vacuum. Vacuum extruder 45 may operate at a temperature within the range of about $300-500°$ F., e.g. $450°$ F., and under a vacuum of illustratively 0.1–200 millimeters mercury absolute, so that the final product discharged as strands 64 may contain less than about one-half percent of hexane. Vacuum extruders are described in the literature, e.g. U.S. Patents 2,203,073 and 2,833,750. This vacuum extruder 45 consists essentially of an impeller screw rotating in a conduit which is surrounded by a heating jacket. As the polymer is carried along the axis of the screw, it is constantly being worked so that by virtue of the combined kneading and working action, new surfaces are continuously being exposed to the vacuum which is maintained in the conduit. One or more vapor draw-off lines 46 are provided for removing the hexane by way of vacuum pump or jet 47, and the vaporized hexane is condensed and conducted through line 48 to hexane fractionating column 49.

Polymer from vacuum extruder 45 is in the form of strands 64, which are cooled and solidified by quenching in water trough 65, then cut by chopper 66, and are thus obtained as a pelleted extrudate 67 in exceedingly high purity. It is water white in color. Polymer yield is 830 pounds per hour. Substantially all of the catalyst, grease, liquid hydrocarbon reaction medium, etc. have been removed from this product.

Returning now to the olefin purification system, olefin charging stock which is introduced through line 1 and recycle olefin which is compressed by compressor 23 and sent through line 24, are combined and introduced to the bottom of caustic scrubber 2, where the olefin stream is scrubbed by dilute caustic (1–20% by weight) for removal of acid gases such as $H_2S$ and $CO_2$. Caustic is introduced through line 3 and withdrawn from the packed tower 2 via line 4.

The caustic scrubbed ethylene stream is conducted through line 5 through water wash tower 6, which may be of the packed type, where a stream of water introduced through line 7 and withdrawn through line 8 removes entrained caustic. The washed ethylene off-gas is withdrawn by way of line 9, and compressed to a pressure above reactor 14 pressure by compressor 10, and then sent to an accumulator or knockout drum not shown, and thence to dryer 11.

Dryer 11 may contain any suitable material which has an affinity for water vapor. Liquids such as ethylene glycol, diethylene glycol, or the like, or solids such as molecular sieves (calcium aluminosilicates or "zeolites" having a pore size of around 5 Angstroms units), silica gel, alumina, or the like may be employed. Preferably, two or more dryers 11 are employed, with suitable manifolding for taking one dryer off stream for regeneration while the other remains in service.

The scrubbed, washed, and dried ethylene stream is then conducted via line 12 to reactor 14 for use in the polymerization process.

Liquid hydrocarbon reaction medium, such as odorless mineral spirits which is separated in melt still 32 and hexane fractionating column 53, is purified for recycle in a pair of solvent stills 54 and 58 and by means of dryer 61 and silica gel percolator 63, before returning it to reactor 14 via line 15. Initial distillation in the first solvent still 54 is for the purpose of separating water, solvent light ends, and any residual ethylene and hexane as an overhead in accumulator 55; water separates as a heavy liquid layer in accumulator 55 and is decanted by way of line 56. The bottoms from solvent still 54 is essentially all solvent together with some high boiling materials, and is conducted to the second or rerunning solvent still 58 via line 57 for removal of these high boiling components. High boiling materials are taken off at line 60 as a bottoms product from the second solvent still 58; this bottoms comprises soluble co-catalyst (such as aluminum alkyls), relatively low molecular weight olefin polymers such as grease or wax, odiferous extracts, and any liquid hydrocarbon reaction medium. This heavy material may be employed as a lubricant oil viscosity index improver, etc.

Both solvent stills 54 and 58 desirably are provided with plurality of fractionating plates or trays, and are each equipped with reflux systems and reboilers, not shown. The overhead stream from solvent still 58 is taken by line 59 to a molecular-sieve-containing vessel 61 for removal of substantially all water; molecular sieves have an affinity for water and can remove essentially all of the dissolved water from the hydrocarbon reaction medium.

Following the foregoing distillation and drying procedures, the solvent is passed at ambient temperature via line 62 to silica gel towers 63, where organic contaminants such as carbonyl compounds are removed. Thus purified, the solvent is then conducted via line 15 to reactor 14. The seilica gel and molecular sieve towers may, if desired, be reversed in order.

From the foregoing description, it will be seen that a remarkably simple system has been provided for purifying homopolymers or copolymers of ethylene and/or propylene, and for recovering excess unreacted olefin, liquid hydrocarbon reaction medium, and catalyst for possible re-use. Solid polymer of exceedingly high quality and suitable for the most restrictive purposes may be readily prepared according to the inventive process. The above advantages are attained irrespective of whether the reactor system is operated on a batchwise or continuous basis. If a continuous reactor system is employed, there are additional advantages of heat utilization, temperature control and catalyst handling.

While the invention has been described with reference to a particular example thereof, it should be understood that alternate and equivalent embodiments of the preferred embodiment described above may be employed without departing from the spirit and broad scope of the present invention as defined in the claims. Also, the inventive process may be employed with monomers or comonomers other than ethylene and propylene alone to obtain homopolymers or copolymers of such olefins as butene-1, ethylene-butene-1, etc., by appropriate modification of operating conditions.

We claim:

1. In a process for the preparation of a normally solid polymer of an olefin selected from the group consisting of ethylene, propylene, butene-1 and mixtures thereof, wherein said polymer is obtained as an extruded gel containing a substantially inert, high boiling liquid hydrocarbon reaction medium having a mid-boiling point within the range of about 200 to about 480° F., the improved step whereby said normally solid olefin polymer is recovered in high purity which comprises: extracting the extruded gel with a paraffinic solvent having a boiling point lower than the mid-boiling point of said reaction medium, to remove said reaction medium and any "grease," and thereafter recovering normally solid olefin polymers.

2. Process of claim 1 wherein said high boiling liquid hydrocarbon reaction medium has a mid-boiling point within the range of about 350–400° F.

3. Process of claim 1 wherein said olefin is ethylene.

4. Process of claim 1 wherein said solvent is hexane.

References Cited in the file of this patent

UNITED STATES PATENTS

| | | |
|---|---|---|
| 2,825,721 | Hogan et al. | Mar. 4, 1958 |
| 2,837,504 | Hanson et al. | June 3, 1958 |
| 2,845,410 | De Vault | July 29, 1958 |
| 2,845,414 | Schutze | July 29, 1958 |
| 2,880,199 | Jezl | Mar. 31, 1959 |
| 2,880,201 | Peters et al. | Mar. 31, 1959 |
| 2,890,214 | Brightbill et al. | June 9, 1959 |
| 2,893,984 | Seelback et al. | July 7, 1959 |
| 2,894,824 | Lanning | July 14, 1959 |
| 2,897,184 | Kimble et al. | July 28, 1959 |
| 2,964,513 | Dale | Dec. 13, 1960 |
| 2,989,516 | Schneider | Jan. 20, 1960 |